(12) United States Patent
Wiggen et al.

(10) Patent No.: US 12,344,324 B2
(45) Date of Patent: Jul. 1, 2025

(54) UNDERBODY CLADDING ELEMENT FOR A VEHICLE AND ARRANGEMENT OF AN UNDERBODY CLADDING ON A BODY OF A VEHICLE

(71) Applicant: Mercedes-Benz Group AG, Stuttgart (DE)

(72) Inventors: Stefan Wiggen, Renningen (DE); Francois Wittmann, Sindelfingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 326 days.

(21) Appl. No.: 18/041,107

(22) PCT Filed: Jul. 9, 2021

(86) PCT No.: PCT/EP2021/069165
§ 371 (c)(1),
(2) Date: Feb. 9, 2023

(87) PCT Pub. No.: WO2022/033784
PCT Pub. Date: Feb. 17, 2022

(65) Prior Publication Data
US 2023/0339554 A1 Oct. 26, 2023

(30) Foreign Application Priority Data
Aug. 11, 2020 (DE) ...................... 10 2020 004 886.2

(51) Int. Cl.
B62D 35/02 (2006.01)
(52) U.S. Cl.
CPC .................. B62D 35/02 (2013.01)

(58) Field of Classification Search
CPC ................................ B62D 35/02; Y02T 10/82
(Continued)

(56) References Cited

U.S. PATENT DOCUMENTS

| 4,772,060 A | 9/1988 | Kretschmer |
| 4,789,117 A | 12/1988 | Paterson et al. |

(Continued)

FOREIGN PATENT DOCUMENTS

| CN | 102822041 A | 12/2012 |
| CN | 108216392 A | 6/2018 |

(Continued)

OTHER PUBLICATIONS

German-language German Office Action issued in German application No. 10 2020 004 886.2 dated May 26, 2023 (Five (5) pages).

(Continued)

*Primary Examiner* — Gregory A Blankenship
(74) *Attorney, Agent, or Firm* — Crowell & Moring LLP (57) ABSTRACT

An underbody cladding element includes a first air channelling region, a second air channelling region disposed at a rear end of the underbody cladding element, and a flow separation edge. The flow separation edge is disposed behind the second air channelling region in the longitudinal direction of the vehicle. An air flow channelled along the second air channelling region is detachable in a defined manner at the flow separation edge when the vehicle is travelling forward. A longitudinal region of the flow separation edge is configured unevenly in a first plane projected onto a second plane defined by a transverse direction of the vehicle and the longitudinal direction of the vehicle. The flow separation edge has a basic body which is curved downward in the vertical direction of the vehicle.

9 Claims, 3 Drawing Sheets

(58) Field of Classification Search
USPC .................................................. 296/180.1
See application file for complete search history.

(56) References Cited

U.S. PATENT DOCUMENTS

| | | | |
|---|---|---|---|
| 5,322,340 | A | 6/1994 | Sato et al. |
| 9,308,950 | B2 | 4/2016 | Wolf |
| 10,214,255 | B1* | 2/2019 | Suzuka .................. B60R 19/023 |
| 2006/0108830 | A1 | 5/2006 | Ordonio, Jr. et al. |
| 2011/0309652 | A1 | 12/2011 | Eichentopf et al. |
| 2013/0059519 | A1* | 3/2013 | Tajima .................... B60K 11/04 |
| | | | 454/152 |
| 2016/0244032 | A1 | 8/2016 | Pallu |
| 2018/0162458 | A1 | 6/2018 | McMillan et al. |
| 2018/0170457 | A1 | 6/2018 | Fahland et al. |
| 2022/0219766 | A1* | 7/2022 | Moradnia ............... B62D 35/02 |
| 2022/0219768 | A1* | 7/2022 | Moradnia ............ B62D 35/007 |
| 2023/0278506 | A1* | 9/2023 | Nihei ...................... B62D 35/02 |
| | | | 296/193.07 |
| 2023/0339554 | A1* | 10/2023 | Wiggen ................. B62D 35/02 |
| 2025/0115311 | A1* | 4/2025 | Green .................... B62D 35/02 |

FOREIGN PATENT DOCUMENTS

| | | |
|---|---|---|
| DE | 1 862 696 U | 11/1962 |
| DE | 36 17 538 A1 | 11/1987 |
| DE | 40 15 871 A1 | 11/1991 |
| DE | 43 17 769 A1 | 1/1994 |
| DE | 43 19 281 A1 | 12/1994 |
| DE | 201 16 286 U1 | 1/2002 |
| DE | 10 2004 047 882 A1 | 4/2006 |
| DE | 10 2009 040 678 A1 | 4/2010 |
| DE | 10 2013 009 256 A1 | 12/2014 |
| DE | 10 2014 211 466 A1 | 1/2015 |
| DE | 10 2013 219 549 A1 | 4/2015 |
| DE | 10 2014 110 199 A1 | 1/2016 |
| DE | 10 2016 005 060 A1 | 9/2016 |
| DE | 10 2015 005 013 A1 | 10/2016 |
| DE | 10 2015 118 076 A1 | 4/2017 |
| DE | 10 2017 007 476 A1 | 2/2018 |
| DE | 10 2017 005 773 A1 | 12/2018 |
| EP | 2 435 288 B1 | 4/2012 |
| JP | 2014-162323 A | 9/2014 |
| WO | WO 2016/007979 A1 | 1/2016 |

OTHER PUBLICATIONS

PCT/EP2021/069165, International Search Report dated Oct. 4, 2021 (Two (2) pages).
German-language German Office Action issued in German application No. 10 2020 004 886.2 dated Mar. 8, 2021 (Five (5) pages).
Chinese-language Chinese Office Action issued in Chinese Application No. 202180057941.7 dated Nov. 14, 2024 (8 pages).
Chinese-language Office Action issued in Chinese Application No. 202180057941.7 dated Apr. 11, 2025 (8 pages).

* cited by examiner

UNDERBODY CLADDING ELEMENT FOR A VEHICLE AND ARRANGEMENT OF AN UNDERBODY CLADDING ON A BODY OF A VEHICLE

BACKGROUND AND SUMMARY OF THE INVENTION

The invention relates to an underbody cladding element for a vehicle. The invention also relates to an arrangement of an underbody cladding on a body of a vehicle.

DE 10 2013 219 549 A1 discloses a covering element for an underbody cladding for the at least partial covering of an underbody of a motor vehicle. The covering element has at least one first region and at least one flexibly deformable second region which is connected to the first region and is softer than the first region. A cladding for an underbody of a motor vehicle is also known from DE 201 16 286 U1. EP 2 435 288 B1 discloses a vehicle having an air channelling device. An air channelling device for a motor vehicle is also to be inferred as known from DE 10 2009 040 678 A1.

The generic DE 10 2015 005 013 A1 discloses an air channelling device for a control arm, which is configured to be flat and passes at least in sections under the control arm into an installation position, wherein, when the air channelling device is used as intended, a flow of air flows along a surface of the air channelling device and detaches from the air channelling device at a flow-off edge having a continually changing spatial course.

The problem underlying the present invention is to create an underbody cladding element for a vehicle and an arrangement of an underbody cladding on a body of a vehicle so that particularly advantageous aerodynamics of the vehicle can be achieved.

A first aspect of the invention relates to an underbody cladding element for a vehicle, in particular a passenger vehicle. The underbody cladding element is therefore used when the vehicle is in its fully manufactured state in order to at least partially cover and therefore clad an underbody of the vehicle, also referred to as the floor, downwards in the vertical direction of the vehicle. The underbody is formed here by a body of the vehicle configured, for example, as a self-supporting chassis, the underbody at least partially, in particular at least predominantly or completely, delimiting an interior space of the vehicle, also referred to as the passenger compartment, downwards in the vertical direction of the vehicle.

The underbody cladding element has an air channelling region which is provided, at its rear end when viewed in the longitudinal direction of the vehicle, with a flow separation edge at which, when the vehicle is travelling forwards, an air flow channelled along the air channelling region detaches in a defined manner. At least one longitudinal region of the flow separation edge is configured unevenly in a plane projected onto a plane defined by the transverse direction of the vehicle (y direction in the vehicle coordinate system) and the longitudinal direction of the vehicle (x direction in the vehicle coordinate system) here. As a result of the unevenly formed configuration of the flow separation edge described, the flow resistance can be reduced and the following shear layer can be stabilized.

The underbody cladding element has a first air channelling region and a second air channelling region which, in particular, in the installation position of the underbody cladding element, is connected, in particular directly, to the first air channelling region to the rear in the longitudinal direction of the vehicle. The underbody cladding element takes up its installation position when the vehicle is in its fully manufactured state here and therefore when the underbody cladding element or an underbody cladding comprising the underbody cladding element is held at least indirectly, in particular directly, on the body and arranged, in particular, beneath the underbody in the vertical direction of the vehicle. The feature that the second air channelling region is directly connected to the first air channelling region to the rear in the longitudinal direction of the vehicle is to be understood, in particular, as meaning that no further region of the underbody cladding element is arranged between the first air channelling region and the second air channelling region in the longitudinal direction of the vehicle. The second air channelling region is angled with respect to the first air channelling region and extends away from the first air channelling region, from a lower point at the front to a higher point at the rear, in the longitudinal direction of the vehicle when the underbody cladding element is in the installation position. This means that the second air channelling region has a course, similar to a ramp, which rises counter to the direction of forwards travel of the vehicle, that is to say when viewed in the direction of the rear of the vehicle. For example, air which flows along the underbody cladding element and, in so doing, along the air channelling regions when the vehicle is travelling forwards, in particular on a side of the underbody cladding element facing away from the underbody and pointing downwards in the vertical direction of the vehicle, is guided upwards in the vertical direction of the vehicle by means of the second air channelling region functioning as a ramp, that is to say, in particular, from a lower point at the front to a higher point at the rear in the longitudinal direction of the vehicle. The air flowing along the air channelling regions or the underbody cladding element is also referred to as an air flow or forms an air flow which can specifically and advantageously be guided by means of the air channelling regions.

The features that the second air channelling region is angled with respect to the first air channelling region and extends away from the first air channelling region, from a lower point at the front to a higher point at the rear, in the longitudinal direction of the vehicle is to be understood, in particular, as meaning that a front end of the second air channelling region in the longitudinal direction of the vehicle is arranged, in the vertical direction of the vehicle, below a rear end of the second air channelling region in the longitudinal direction of the vehicle. When viewed from front to rear in the longitudinal direction of the vehicle, the second air channelling region begins at its front end at which, for example, the first air channelling region ends. The second air channelling region also ends at its rear end. The feature that the second air channelling region is angled with respect to the first air channelling region is therefore to be understood, in particular, as meaning that an imaginary line connecting the front end to the rear end extends, for example, obliquely to the first air channelling region or obliquely to the longitudinal direction of the vehicle and/or obliquely to the vertical direction of the vehicle and, in so doing, in particular, obliquely to an imaginary plane defined by the longitudinal direction of the vehicle in the transverse direction of the vehicle. The rear end of the second air channelling region is arranged behind the front end of the second air channelling region in the longitudinal direction of the vehicle.

The flow separation edge follows the second air channelling region to the rear in the longitudinal direction of the vehicle, and is therefore arranged behind the second air channelling region, in particular behind the rear end of the second air channelling region, in the longitudinal direction of the vehicle and, in particular, counter to the direction of forwards travel of the vehicle here. It is conceivable, in principle, for the flow separation edge to be connected directly to the second air channelling region to the rear in the longitudinal direction of the vehicle, this being understood, in particular, as meaning that no further region of the underbody cladding element is arranged between the second air channelling region and the flow separation edge in the longitudinal direction of the vehicle. In particular, it is conceivable here for the flow separation edge to be connected directly to the second end of the second air channelling region or to be arranged at the second end of the air channelling region to the rear in the longitudinal direction of the vehicle.

At least one longitudinal region of the flow separation edge unevenly configured in a plane or in the abovementioned plane defined by the transverse direction of the vehicle and the longitudinal direction of the vehicle, when the underbody cladding element is viewed from the bottom upwards in the vertical direction of the vehicle. This is to be understood, in particular, as meaning that at least the longitudinal region of the flow separation edge has an uneven course, that is to say a course departing from a straight or planar course, in the plane defined by the transverse direction of the vehicle and the longitudinal direction of the vehicle and also referred to as the x-y plane. In particular, provision is preferably made for the flow separation edge to have an uneven course in the x-y plane at least over the majority of its extent running in the transverse direction of the vehicle, that is to say over more than half of its extent running in the transverse direction of the vehicle. Expressed differently again, the feature that the flow separation edge is unevenly configured in the x-y plane at least in the longitudinal region is to be understood as meaning that at least the longitudinal region of the flow separation edge, when viewed from above, that is to say in a direction of view from the bottom upwards or from the top downwards in the vertical direction of the vehicle, is unevenly configured.

It has proved to be particularly advantageous if the flow separation edge has an uneven course over its entire extent in the x-y plane running in the transverse direction of the vehicle, that is to say is unevenly configured. The feature that at least the longitudinal region of the flow separation edge is unevenly configured in the x-y plane is to be understood, in particular, as meaning that, for example, a projection of the flow separation edge running perpendicularly to the x-y plane into the plane is not a straight line or does not run straight at least in the longitudinal region, but instead the projection has an uneven course at least in the longitudinal region or in its region corresponding to the longitudinal region of the flow separation edge. At the flow separation edge, when there is forwards travel or when the vehicle is travelling forwards as specified above, the air flow which is first of all channelled or flows along the second air channelling region detaches in a defined manner, wherein, because at least the longitudinal region of the flow separation edge is unevenly configured in the x-y plane, the air resistance of the vehicle can be kept particularly low. As a result, the vehicle can be driven particularly energy efficiently. In other words, when the vehicle is travelling forwards, air flows around the vehicle from the front to the rear in the longitudinal direction of the vehicle, wherein at least some of the air flows along the underbody cladding element. By means of the air channelling regions, the air flow which flows along the underbody cladding element can be guided or channelled particularly advantageously and appropriately.

The underbody cladding element causes, in particular, the air flowing along the underbody cladding element, which is also referred to as the underbody flow, to be diverted upwards in the vertical direction of the vehicle by means of the second air channelling region, in particular when the air first of all flows along the first air channelling region and then along the second air channelling region. This means that the second air channelling region causes a diversion of the underbody flow upwards in the vertical direction of the vehicle. Expressed differently again, the underbody flow is first of all guided away upwards, in particular slightly, in the vertical direction of the vehicle by means of the second air channelling region. Then, through the flow separation edge arranged behind the second air channelling region in the longitudinal direction of the vehicle, a sharp change of direction of the air flow downwards in the vertical direction of the vehicle is brought about, thereby achieving a desired effect of a spoiler. Since the flow separation edge is unevenly configured at least in the longitudinal region in the x-y plane, a non-uniform configuration of the flow separation edge is achieved. As a result, the air resistance, also simply referred to as the resistance, can be kept particularly low and any following shear layer can be stabilized. The flow separation edge and therefore the underbody cladding element can also be configured to be particularly stable or rigid overall as a result of the change of direction of the air flow which can be brought about by means of the underbody cladding element, without causing any aerodynamic disadvantages.

Because the second air channelling region preferably extends upwards in the form of a ramp in the vertical direction of the vehicle, the flow separation edge can also begin at a sufficiently high level in the vertical direction of the vehicle and, starting from this level, extend downwards in the vertical direction of the vehicle, it simultaneously being possible to guarantee a sufficient ground clearance of the vehicle overall. Compared to a straight configuration of the flow separation edge or of the longitudinal region in the x-y plane, the uneven configuration at least of the longitudinal region results in a higher shear layer through mixing, that is to say in an effect similar to a vortex generator, in particular geometrically in the direction of flow of the air.

The invention is based, in particular, on the following findings here: Aerodynamic separation edges of underbody coverings such as, for example, spoilers in front of wheel wells can keep an inflow of air in a respective region lying downstream low or can reduce it compared to a vehicle without such a separation edge, meaning that the air resistance can be kept low or reduced. However, the flow separation edge, in particular its very form, usually generates a resistance to the air flow which has to be offset by the above-described function to keep excessive inflow into downstream regions low. The shear layer could be stabilized using an air channelling edge configured to be completely straight. Also conceivable are separation edges that have a shape which itself has reduced resistance by being configured, for example, at an acute angle similar to a ramp. However, these measures reduce the ground clearance and usually require the flow separation edge to be produced from expensive, flexible materials in order to avoid damage. For reasons of rigidity, end edges of underbody components are often configured with a part sticking vertically upwards or upwards in the vertical direction of the vehicle. A crossing with a radius is usually provided which strengthens an inflow in a region upwards and therefore increases the air resistance.

It has been found that uneven end edges and, for example, here, end edges of bodies configured in a sinusoidal shape and/or in a jagged shape, that is to say in a zigzag shape, in particular blunt bodies or plates, can considerably reduce the resistance compared to a straight configuration of the end edges. The shear layer is favourably influenced by such an uneven configuration. As a result, in particular, of at least the longitudinal region of the flow separation edge being unevenly configured, the invention now makes it possible for the second air channelling region arranged in front of the flow separation edge to rise, in particular like a ramp, in the longitudinal direction of the vehicle. Sufficient ground clearance of the vehicle can thereby be guaranteed. The underbody cladding element can also be configured to be particularly rigid. Any air resistance generated by the flow separation edge itself can also be kept particularly low so that, overall, particularly advantageous aerodynamics of the vehicle can be provided.

In order to be able to keep the air resistance of the vehicle overall and the air resistance of the flow separation edge per se particularly low and to be able to achieve a particularly advantageous level of rigidity of the flow separation edge and of the underbody cladding element overall, provision is made, in one embodiment of the invention, for at least the longitudinal region to be configured in a zigzag shape or in a wave shape or in a meandering shape and therefore unevenly in the plane.

A further embodiment is characterized by the fact that at least the longitudinal region is configured in a sinusoidal shape and therefore unevenly in the plane. As a result, particularly advantageous aerodynamics of the vehicle can be achieved since the air resistance of the vehicle overall and the air resistance of the flow separation edge itself can be kept within a particularly low range.

In order to be able to achieve a particularly advantageous level of rigidity of the underbody cladding element and therefore to be able to guide the air flowing along the underbody cladding element particularly advantageously, provision is made, in a further configuration of the invention, for the flow separation edge to be provided with ribs which are spaced apart from one another and lie consecutively in the transverse direction of the vehicle to reinforce the flow separation edge. For example, the flow separation edge is configured integrally with the ribs. For example, the flow separation edge is formed from a plastic and/or manufactured by injection moulding.

In order to be able to detach the air or the air flow particularly advantageously when the vehicle is travelling forwards, in particular from the underbody cladding element, provision is made, in a further configuration of the invention, for the flow separation edge to have a basic body which is curved downwards in the vertical direction of the vehicle. According to a development of the invention, provision is made for the flow separation edge to have a wall protruding from the basic body downwards in the vertical direction of the vehicle.

A further embodiment provides for the second air channelling region to be configured integrally with the first air channelling region and/or with the flow separation edge. Undesired vortexes of the air flowing along the underbody cladding element can thereby be avoided.

A further embodiment is characterized by the fact that a third air channelling region of the underbody cladding element is arranged between the second air channelling region and the flow separation edge in the longitudinal direction of the vehicle. It is conceivable here for the third air channelling region to be configured integrally with the first air channelling region and/or integrally with the second air channelling region and/or integrally with the flow separation edge. The third air channelling region begins, for example, at the rear end of the second air channelling region. Provision may alternatively or additionally be made for the flow separation edge to be connected directly to the third air channelling region to the rear in the longitudinal direction of the vehicle.

The third air channelling region is preferably configured such that the third air channelling region extends in the x-y plane or in a further place running parallel to the x-y plane. Therefore, provision is preferably made for the third air channelling region to run at least substantially horizontally. In particular, if the flow separation edge is connected directly to the third air channelling region to the rear in the longitudinal direction of the vehicle, for example, the flow separation edge protrudes from the third air channelling region downwards in the vertical direction of the vehicle. If the flow separation edge is connected directly to the second air channelling region to the rear in the longitudinal direction of the vehicle, then provision can be made, in particular, for the flow separation edge to protrude from the second air channelling region downwards in the vertical direction of the vehicle.

By means of the third air channelling region, the air flowing along the underbody cladding element can be guided particularly advantageously from the second air channelling region to the flow separation edge, whereupon, by means of the flow separation edge, a flow separation of the air from the underbody cladding element can be brought about in a specific and defined manner.

In order to achieve particularly advantageous aerodynamics and, at the same time, particularly advantageous ground clearance of the vehicle, provision is made, in a further configuration of the invention, for the first air channelling region to extend in the x-y plane or in a second plane running parallel to the x-y plane.

Finally, it has proved to be particularly advantageous if the third air channelling region is arranged above the first air channelling region in the vertical direction of the vehicle. A particularly large ground clearance of the vehicle running in the vertical direction of the vehicle can thereby be achieved.

The second air channelling region and/or the third air channelling region are preferably configured to be planar. This is to be understood, in particular, as meaning that the second or third air channelling region extends at least predominantly, in particular completely, in a plane which preferably runs obliquely to the longitudinal direction of the vehicle.

In order to be able to guide the air particularly advantageously, provision is made, in a further configuration of the invention, for the air channelling region to be curved upwards or downwards in the vertical direction of the vehicle. In particular, when the underbody cladding element is viewed from the bottom upwards in the vertical direction of the vehicle, the second air channelling region is convexly curved when it is curved downwards in the vertical direction of the vehicle. However, if the second air channelling region is curved upwards in the vertical direction of the vehicle, then the second air channelling region is concavely curved.

The underbody cladding element is preferably formed from a plastic and/or integrally configured in order to be able to provide particularly advantageous aerodynamics in a particularly inexpensive and lightweight way.

A second aspect of the invention relates to an arrangement of an underbody cladding on a body of a vehicle, in particular of a motor vehicle, which is preferably configured as a self-supporting chassis. The motor vehicle may be a motor vehicle configured as a passenger vehicle here. In the arrangement, a floor of the body, also referred to as the underbody, is at least partially, in particular at least predominantly or completely, overlaid by the underbody cladding and therefore clad downwards in the vertical direction of the vehicle. The underbody cladding has at least one underbody cladding element according to the first aspect of the invention here. The floor of the body is therefore at least partially, in particular at least predominantly or completely, overlaid or covered by the underbody cladding element downwards in the vertical direction of the vehicle. Advantages and advantageous configurations of the first aspect of the invention are to be regarded as advantages and advantageous configurations of the second aspect of the invention and vice versa.

A rear axle of the vehicle can be arranged behind the underbody cladding element and therefore behind the flow separation edge in the longitudinal direction of the vehicle. The rear axle preferably has at least one control arm, also simply referred to as a controller, via which a wheel of the vehicle, also referred to as a vehicle wheel, is coupled in an articulated manner to the body. The controller is coupled in an articulated manner to the wheel, for example, at least indirectly at one end here. For example, the control arm is coupled in an articulated manner at one end to a wheel carrier on which the wheel is rotatably mounted. At the other end, the control arm is coupled in an articulated manner, for example, at least indirectly, in particular directly to the body. For example, at the other end, the control arm is coupled in an articulated manner directly to the body. It is alternatively conceivable for the control arm to be coupled in an articulated manner at the other end to an axle carrier which is configured separately from the body and mounted on the body. The control arm guides the wheel and, for example, allows spring movement of the wheel in and out in the vertical direction of the vehicle and relative to the body.

The control arm is preferably at least partially overlaid, downwards in the vertical direction of the vehicle, by a further cladding element arranged behind the underbody cladding element and therefore behind the flow separation edge in the longitudinal direction of the vehicle. The further cladding element is, for example, configured separately from the controller and held on the controller and is therefore movable with the controller relative to the body. A particularly advantageous guiding of the underbody flow, in particular to a diffuser to the rear, can thereby be guaranteed.

Finally, it has therefore proved to be particularly advantageous if the abovementioned diffuser is arranged behind the axle in the longitudinal direction of the vehicle. Particularly advantageous aerodynamics and particularly advantageous driving dynamics of the vehicle can thereby be provided.

The configuration of the underbody described above can also easily be inserted or arranged in front of a front wheel of the vehicle. The underbody cladding according to the invention would also produce its advantageous effect in this position in or on the vehicle.

Further advantages and details of the invention are set out in the following description and by reference to the drawings.

DETAILED DESCRIPTION OF THE DRAWINGS

Figure 1:
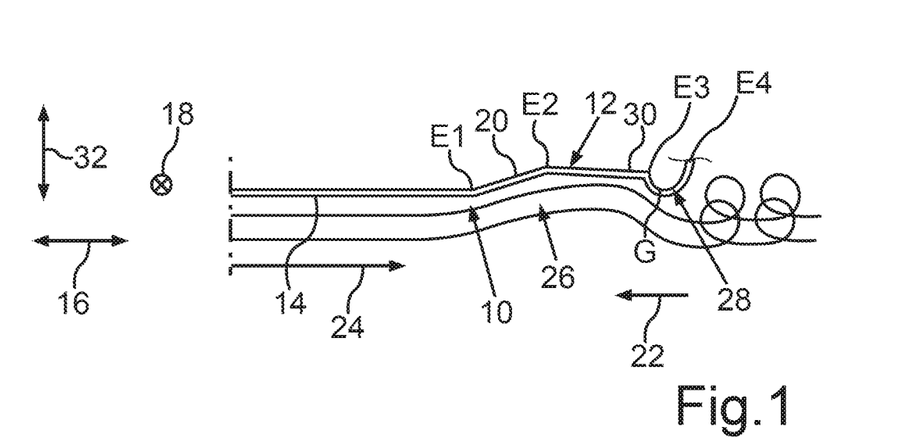
FIG. 1 shows, in the form of an excerpt, a schematic cross-sectional side view of a first exemplary embodiment of an underbody cladding of a vehicle, wherein the underbody cladding has an underbody cladding element with three air channelling regions arranged consecutively in the longitudinal direction of the vehicle and a flow separation edge following the air channelling regions to the rear in the longitudinal direction of the vehicle.

FIG. 1 shows, in the form an excerpt, a schematic cross-sectional side view of an underbody cladding 10 for a vehicle preferably configured as a passenger vehicle. The vehicle has, in its fully manufactured state, a body preferably configured as a self-supporting chassis which comprises an underbody, also referred to as a floor. As a result of the underbody, a passenger compartment of the vehicle, also referred to as an interior space, is at least partially, in particular at least predominantly or completely, delimited downwards in the vertical direction of the vehicle. In the fully manufactured state of the vehicle, the vehicle comprises the underbody cladding 10 which is arranged under the underbody in the vertical direction of the vehicle. As a result, the underbody is at least partially, in particular at least predominantly or completely, covered or overlaid and therefore clad by the underbody cladding 10 downwards in the vertical direction of the vehicle. The underbody cladding 10 is therefore located between the floor of the chassis and the road.

Figure 2:
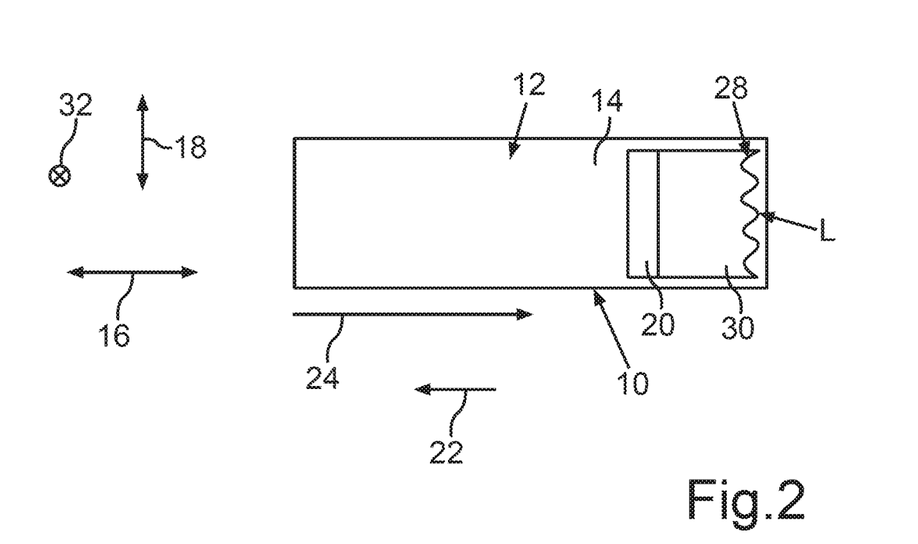
FIG. 2 shows, in the form of an excerpt, a schematic view of the underbody cladding according to FIG. 1 from underneath.

As can be seen particularly clearly in conjunction with FIG. 2, the underbody cladding 10 comprises at least one underbody cladding element 12, as a result of which the underbody is at least partially, in particular at least predominantly or completely, overlaid downwards in the vertical direction of the vehicle (the z direction in the vehicle coordinate system). For example, the underbody cladding element 12 is configured integrally and/or from a plastic.

The underbody cladding element 12 has a first air channelling region 14. FIG. 1 shows a first embodiment of the underbody cladding 10 here. In the first embodiment, the air channelling region 14 is configured at least predominantly, in particular completely, at least substantially, to be planar, wherein the air channelling region 14 extends in a first plane which is defined by the longitudinal direction of the vehicle (the x direction in the vehicle coordinate system) and the transverse direction of the vehicle (the y direction in the vehicle coordinate system). This means that the first air channelling region 14 which is configured to be planar is aligned parallel to the road. The longitudinal direction of the vehicle is illustrated by a double arrow 16 in FIGS. 1 and 2, whilst the transverse direction of the vehicle is illustrated by a double arrow 18.

The underbody cladding element 12 also has a second air channelling region 20, following the first air channelling region 14 to the rear in the longitudinal direction of the vehicle, which is connected directly to the first air channelling region 14 to the rear in the longitudinal direction of the vehicle. A front end of the air channelling region 20 in the longitudinal direction of the vehicle is designated by E1 in FIG. 1, the second air channelling region 20 beginning at the end E1. The air channelling region 14 ends at the end E1. A rear end of the second air channelling region 20 in the longitudinal direction of the vehicle is also designated by E2, the second air channelling region 20 ending at the rear end E2. The second air channelling region 20 is angled with respect to the first air channelling region 14 such that the second air channelling region 20 extends away from the first air channelling region 14 from a lower point at the front to a higher point at the rear in the longitudinal direction of the vehicle. The air channelling region 20 is therefore configured similarly to a ramp or in the form of a ramp.

In FIG. 1, the forwards direction of travel of the vehicle is also illustrated by an arrow 22. When the vehicle is moved forwards, that is to say in its forwards travelling direction, then the vehicle has air flowing around it. In FIG. 1, a direction of flow of the air flowing around the vehicle when it is travelling forwards is illustrated by an arrow 24 here. At least some of the air flowing around the vehicle when it is travelling forwards flows in the underbody region of the vehicle along the first and second air channelling regions 14 and 20 and therefore along the underbody cladding element 12. In FIG. 1, lines 26 also designated as flow lines illustrate here the air flowing along the underbody cladding element 12 when the vehicle is travelling forwards, this also being referred to as the air flow or underbody flow. As can be seen, the underbody flow first of all flows along the air channelling region 14 and at least substantially parallel to the first plane here and is then guided by means of the air channelling region 20 upwards in the vertical direction of the vehicle.

In order now to be able to achieve particularly advantageous aerodynamics of the vehicle, the underbody cladding element 12 also has a flow separation edge 28 following the second air channelling region 20 to the rear in the longitudinal direction of the vehicle, at which, when the vehicle is travelling forwards, the air flow (underbody flow) channelled along the second air channelling region 20 detaches in a defined manner. As can be seen in conjunction with FIG. 2, at least one longitudinal region L of the flow separation edge 28 is configured unevenly in a plane projected onto an x-y plane defined by the transverse direction of the vehicle and by the longitudinal direction of the vehicle and also referred to as a second plane, it being possible for this to be spaced apart from the first plane and to run parallel to the first plane or coincides with the first plane.

In the first embodiment shown in FIGS. 1 and 2, the flow separation edge 28 is configured unevenly over its entire extent in the x-y plane running in the transverse direction of the vehicle. In the first embodiment, the flow separation edge 28 is configured in a wave shape and therefore unevenly here, that is to say in the x-y plane. As a result, the air resistance of the flow separation edge 28 itself and the air resistance of the vehicle overall can be kept low so that the vehicle can be driven particularly energy efficiently. In particular, it is conceivable for the flow separation edge 28 to be configured in a wave shape so that the flow separation edge 28 is configured in a sinusoidal shape. This means that the flow separation edge has a sinusoidal shaped course in the x-y plane, that is to say a course like a sinus curve.

Provision is also made in the first embodiment for the underbody cladding element 12 to have a third air channelling region 30 arranged between the second air channelling region 20 and the flow separation edge 28 in the longitudinal direction of the vehicle. The third air channelling region 30 begins at the end E2 at which the second air channelling region 20 ends. The third air channelling region 30 ends at the flow separation edge 28 so that the flow separation edge 28 is arranged at the third air channelling region 30, in particular at its rear end E3, or is connected directly to the end E3 of the air channelling region 30 to the rear in the longitudinal direction of the vehicle. The air channelling region 30 is configured to be at least partially, in particular at least predominantly or completely, at least substantially planar and therefore extends in a third plane defined by the longitudinal direction of the vehicle and the transverse direction of the vehicle. The third plane runs parallel to the first plane and is spaced apart from the first plane. The air channelling region 30 is therefore arranged above the air channelling region 14 in the vertical direction of the vehicle. The flow separation edge 28 also has a basic body G which is curved downwards in the vertical direction of the vehicle. The basic body G is configured to be U-shaped at least in the region of the sectional plane shown in FIG. 1 here. Owing to the basic body G which is spaced apart downwards in the direction of a road not illustrated or projects downwards with respect to the latter, the air flow is deflected downwards at the flow separation edge 28. The basic body G therefore has the function of a spoiler.

Figure 3:
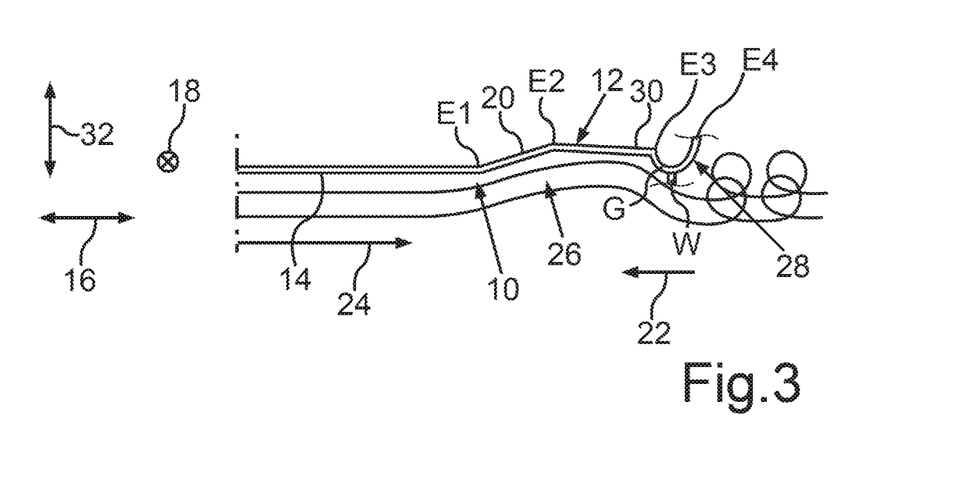
FIG. 3 shows, in the form of an excerpt, a schematic cross-sectional side view of the underbody cladding according to a second embodiment.
Figure 4:
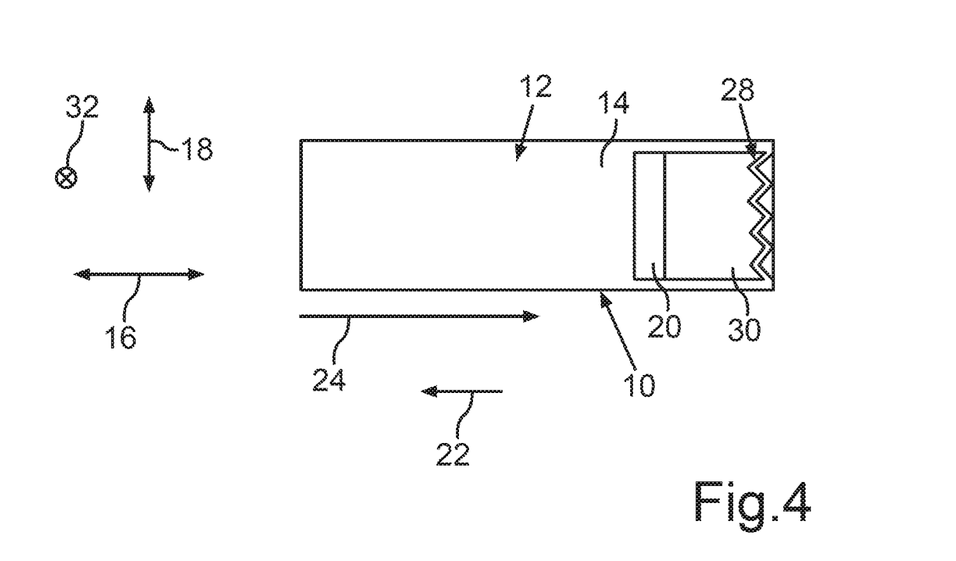
FIG. 4 shows, in the form of an excerpt, a schematic view of the underbody cladding according to FIG. 3 from underneath.

FIGS. 3 and 4 show a second embodiment of the underbody cladding which differs from the first embodiment, in particular, by the fact that the flow separation edge 28 has the basic body G and a wall W protruding from the basic body G in the direction of the road downwards in the vertical direction of the vehicle. The vertical direction of the vehicle is illustrated by a double arrow 32 here. A further difference between the first embodiment and the second embodiment is that the flow separation edge 28 is configured in a zigzag shape in the x-y plane, that is to say in a jagged shape. The wall W can function as an additional, small spoiler edge in order to be able to ensure a flow separation of the underbody flow from the underbody cladding element 12.

Figure 5:
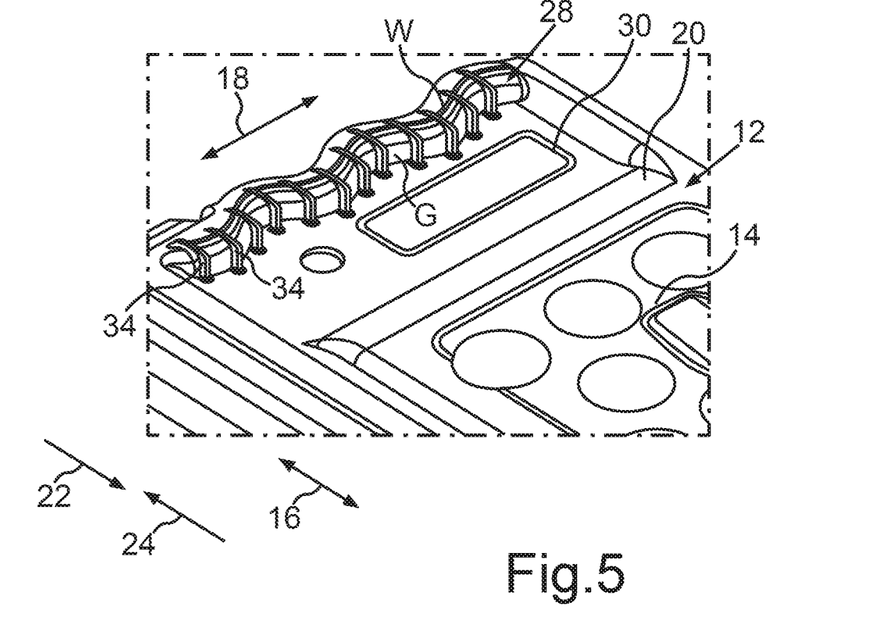
FIG. 5 shows a schematic perspective view of the underbody cladding element according to a third embodiment from underneath.
Figure 6:
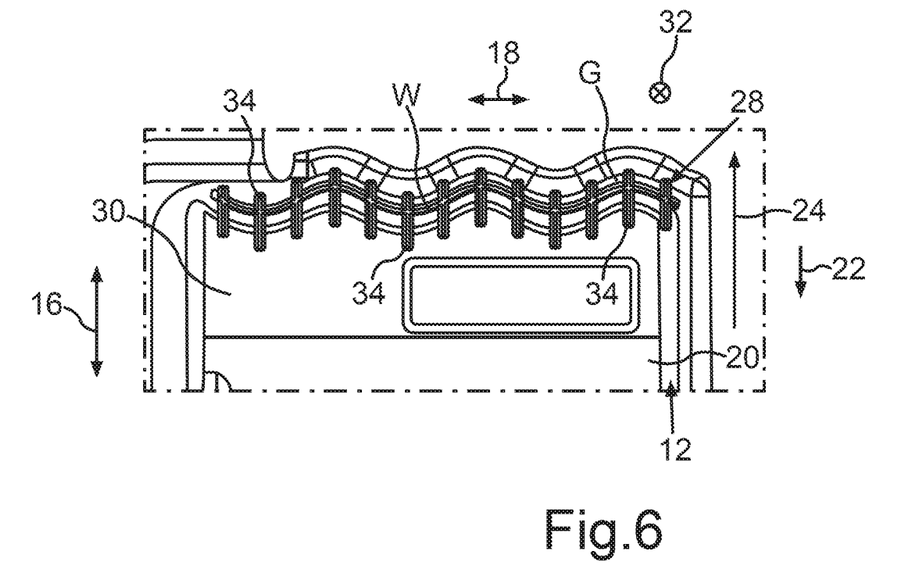
FIG. 6 shows, in the form of an excerpt, a schematic view of the underbody cladding element according to FIG. 5 from underneath.

Finally, FIGS. 5 and 6 show a third embodiment of the underbody cladding element 12. In the third embodiment, the flow separation edge 28 is configured in a wave shape, in particular in a sinusoidal shape. The flow separation edge 28 is also provided with a plurality of ribs 34 which are spaced apart from one another and lie consecutively in the transverse direction of the vehicle. The ribs 34 at least partially, in particular at least predominantly or completely, span the flow separation edge 28 in the longitudinal direction of the vehicle, as a result of which the flow separation edge 28 is effectively reinforced or stiffened by means of the ribs 34. A particularly high rigidity of the underbody cladding element 12 can thereby be achieved, and particularly effective protection against impacts from stones is provided.

It is conceivable for the underbody cladding element 12 to end to the rear in the longitudinal direction of the vehicle at a rear and preferably free end E4 of the flow separation edge 28 in the longitudinal direction of the vehicle. It is also conceivable for an, in particular, small wall region of the underbody cladding element 12 to be connected to the flow separation edge 28, in particular to the basic body G, to the rear in the longitudinal direction of the vehicle.

The invention claimed is:
1. An underbody cladding element (12) for a vehicle, comprising:

a first air channelling region (14);

a second air channelling region (20) disposed at a rear end of the underbody cladding element (12) when viewed in a longitudinal direction (16) of the vehicle;

wherein the second air channelling region (20) is connected to the first air channelling region (14) at a rear of the first air channelling region (14) in the longitudinal direction (16) of the vehicle and is angled with respect to the first air channelling region (14) such that the second air channelling region (20) extends away from the first air channelling region (14) from a lower point at a front of the second air channelling region (20) to a higher point at a rear of the second air channelling region (20) in the longitudinal direction (16) of the vehicle; and a flow separation edge (28), wherein the flow separation edge (28) is disposed behind the second air channelling region (20) in the longitudinal direction (16) of the vehicle and wherein an air flow (26) channelled along the second air channelling region (20) is detachable in a defined manner at the flow separation edge (28) when the vehicle is travelling forward such that the air flow (26) has a sharp change of direction downward in a vertical direction (32) of the vehicle;

wherein a longitudinal region (L) of the flow separation edge (28) is configured unevenly in a first plane projected onto a second plane defined by a transverse direction (18) of the vehicle and the longitudinal direction (16) of the vehicle;

wherein the flow separation edge (28) has a basic body (G) which is curved downward in the vertical direction (32) of the vehicle.

2. The underbody cladding element (12) according to claim 1, wherein the longitudinal region (L) in the first plane is configured in a zigzag shape or in a wave shape or in a meandering shape or in a sinusoidal shape.

3. The underbody cladding element (12) according to claim 1, wherein the flow separation edge (28) has ribs (34) which are spaced apart from one another and lie consecutively in the transverse direction (18) of the vehicle.

4. The underbody cladding element (12) according to claim 1, wherein the flow separation edge (28) has a wall (W) protruding from the basic body (G) downward in the vertical direction (32) of the vehicle.

5. The underbody cladding element (12) according to claim 1, wherein the second air channelling region (20) is configured integrally with the first air channelling region (14) and/or with the flow separation edge (28).

6. The underbody cladding element (12) according to claim 1, further comprising a third air channelling region (30), wherein the third air channelling region (30) is disposed between the second air channelling region (20) and the flow separation edge (28) in the longitudinal direction (16) of the vehicle and wherein the third air channelling region (30) extends in the first plane or in a further plane running parallel to the first plane.

7. The underbody cladding element (12) according to claim 1, wherein the first air channelling region (14) extends in the first plane or in a further plane running parallel to the first plane.

8. The underbody cladding element (12) according to claim 6, wherein the third air channelling region (30) is disposed further up than the first air channelling region (14) in the vertical direction (32) of the vehicle.

9. An arrangement, comprising:

a body of a vehicle with a floor; and an underbody cladding (10) on the body of the vehicle, wherein the floor of the body is at least partially overlaid downward in a vertical direction (32) of the vehicle by the underbody cladding (10);

wherein the underbody cladding (10) has the underbody cladding element (12) according to claim 1.

* * * * *